United States Patent
Yagi et al.

[11] 3,886,121
[45] May 27, 1975

[54] PROCESS FOR PREPARING AROMATIC POLYETHERS

[75] Inventors: Norio Yagi; Hiroshi Okai; Makoto Fukuda; Ikuji Kishi, all of Tokyo, Japan

[73] Assignee: Denki Kagaku Kogyo Kabushiki Kaisha, Japan

[22] Filed: July 30, 1974

[21] Appl. No.: 493,053

[30] Foreign Application Priority Data
July 30, 1973  Japan................. 48-85617

[52] U.S. Cl. ............ 260/49; 260/50; 260/61
[51] Int. Cl. ............................ C08g 23/00
[58] Field of Search............. 260/49, 50, 61

[56] References Cited
UNITED STATES PATENTS

| | | | |
|---|---|---|---|
| 3,264,536 | 8/1966 | Robinson et al. | 317/258 |
| 3,332,909 | 7/1967 | Farnham et al. | 260/47 |
| 3,431,230 | 3/1969 | Jackson, Jr. et al. | 260/33.8 |
| 3,446,654 | 5/1969 | Barth et al. | 117/123 |
| 3,647,751 | 3/1972 | Darsow et al. | 260/49 |

*Primary Examiner*—Lester L. Lee
*Attorney, Agent, or Firm*—Oblon, Fisher, Spivak, McClelland & Maier

[57] ABSTRACT

Aromatic polymers are prepared by heating a condensed oligomer having an average of 1 – 10 units having the formula:

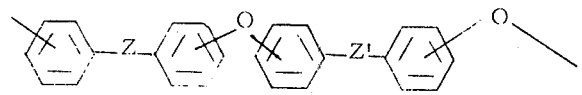

wherein Z represents — $SO_2$ or — CO —, or the rings are directly connected; Z' represents — $SO_2$ — or — CO—; and the ether bond is ortho or para to Z or Z'; at 150° – 400°C in a vacuum or in an inert gas atmosphere in the absence of a solvent.

9 Claims, No Drawings

3,886,121

PROCESS FOR PREPARING AROMATIC POLYETHERS

BACKGROUND OF THE INVENTION

1. Field of the Invention

The present invention relates to a process for preparing aromatic polymers having excellent heat resistance, thermal stability, mechanical strength and improved color.

2. Description of the Prior Art

Aromatic polymers of linear polyarylenepolyethers have been prepared by reacting a di-alkali metal salt of a diphenol with a dihalodiphenyl compound contaning an electron withdrawing group in at least one position ortho- or para- to the halogen atom, in an inert polar organic solvent such as dimethylsulfoxide (Japanese Patent Publication No. 7799/1967). Aromatic polymers having the same structure have been prepared by reacting a dihalodiphenyl compound, activated by an electron attractive group, with an equivalent of an alkali metal hydroxide, hydrosulfite or sulfide (Japanese Patent Publication No. 617/1972) in a polar solvent, or by polymerizing an alkali metal salt of 4- (4-halogenophenylsulfonyl) phenol or 4- (4-halogenobenzoyl) phenol by heating to a temperature higher than 200°C in the absence of a solvent. The aromatic polymers prepared by the se conventional processes possess excellent heat resistance and mechanical strength and are useful as engineering plastics. One characteristic of aromatic polymers is their transparency. However, aromatic polymers prepared by conventional processes, which contain the units:

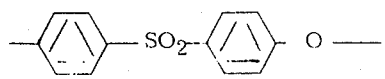

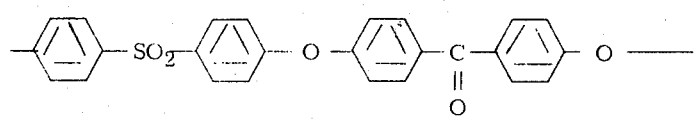

or

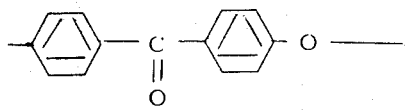

have a brown color, so that the light-transmittance of the polymer is low and the commercial value of the polymer is lowered because of the appearance.

A need exists therefore, for an aromatic polymer which combines all of the advantages of prior art compounds with reduction in color of the polymer.

SUMMARY OF THE INVENTION

Accordingly, one object of the invention is to provide a process for preparing an aromatic polymer having excellent heat resistance, thermal stability, mechanical strength and improved color.

Briefly, this object and other objects of the invention as will hereinafter become more readily apparent can be obtained by condensing a di-alkali metal salt of a phenol with a dihalodiphenyl compound in a molar ratio of 1.04 : 1.00 to 1.00 : 1.04 in an inert polar organic solvent at 80° – 160°C, to form an oligomer containing an average of 1 – 10 structural units, and heating the resulting oligomer in the absence of a solvent at 150° – 400°C under a non reactive atmosphere to effect bulk polymerization.

DETAILED DESCRIPTION OF THE PREFERRED EMBODIMENTS

The condensed oligomeric intermediate of the invention can be prepared by condensing the di-alkali metal salt of a diphenol having the formula

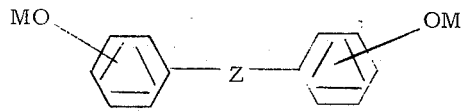

wherein M represents an alkali metal atom and Z represents $-SO_2-$ or $-CO-$ or the rings are directly connected and the $-OM$ groups are ortho or para to Z; with the dihalodiphenyl compound having the formula

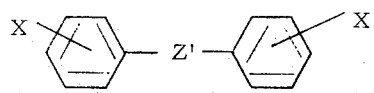

wherein X represents a halogen atom, and Z' represents $-SO_2-$ or $-CO-$ and the $-X$ groups are ortho or para to Z', in an inert polar organic solvent at 80° – 160°C in the molar ratio of 1.04 : 1.00 to 1.00 : 1.04. The reaction temperature is selected so as to give an average condensation degree less than 20.

The condensed oligomers possess low mechanical strength, are brittle, and contain 1 – 10 of the units:

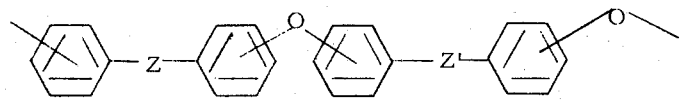

wherein Z represents $-SO_2-$ or $-CO-$ or the rings are directly connected; Z' represents $-SO_2-$ or $-CO-$; and the ether bond is ortho or para to Z or Z'. The softening point of the condensed oligomers is in the range of 150° – 220°C.

The di-alkali metal salt of a diphenol can be prepared by neutralizing the diphenol with an equivalent of an aqueous solution of an alkali metal hydroxide and drying the reaction product. However, it is possible to prepare the salt by reacting a diphenol with an equivalent of an alkali metal, an alkali metal hydride or an alkali metal alkoxide in the solvent to form a di-alkali metal salt and then separating the resulting water by azeotropic distillation. The resulting solution can be used for the condensation by adding the dihalodiphenyl compound. Suitable azeotropic solvents include inert solvents, e.g., benzene, toluene, xylene, halobenzene, or the like. Suitable alkali metals include sodium and potassium. Suitable diphenol starting materials include 4,4'-dihydroxydiphenylsulfone,
2,4'-dihydroxydiphenylsulfone,
4,4'-dihydrocybenzophenone,
2,4'-dihydroxybenzophenone,
4,4'-dihydroxydiphenyl,
2,4'-dihydroxydiphenyl, and the like.

The group Z' of the dihalodiphenyl compound is —SO$_2$— or —CO— which are electron withdrawing groups, and accordingly halogen atoms ortho or para to Z' are more reactive and easily react with the di-alkali metal of a diphenol via a dealkalimethalhalogenation reaction. The preferable halogen atom for the dihalodiphenyl compound is chlorine which is the most economical. Suitable dihalodiphenyl compounds include 4,4'-dichlorodiphenylsulfone,
2,4'-dichlorodiphenylsulfone,
4,4'-dichlorobenzophenone,
2,4'-dichlorobenzophenone, and the like.

Preferable solvents are inert polar organic solvents which will dissolve the di-alkali metal salt of the diphenol and the dihalodiphenyl compound and will not react with these compounds or the resulting product. Suitable solvents include dimethylsulfoxide, dimethylsulfone, diethylsulfoxide, diethylsulfone, tetrahydrothiophene-1, 1-dioxide, tetrahydrothiophene-1-monoxide, N-methyl-2-pyrrolidone, N-n-butyl-2-pyrrolidone, N-phenyl-2-pyrrolidone, N-cyclohexyl-2-pyrrolidone, N-methyl-2-piperidone. Dimethylsulfoxide is the most ecomonical and is most preferred.

The molar ratio of the di-alkali metal salt of the diphenol to the dihalodiphenyl compound should be 1.04 : 1.00 to 1.00 : 1.04, preferably 1.03 : 1.00 to 1.00 : 1.03. When the molar ratio is out of this range, the mechanical strength of the resulting aromatic polymer will be insufficient for use as an engineering plastic. The preferable temperature of the condensation reaction should be 80° – 160°C. If the temperature is less than 80°C, the reaction velocity will be too low. On the other hand, if the temperature is higher than 160°C, thermal decomposition and thermal deterioration of the solvent will occur, whereby coloring, gelation of the aromatic polymer and inactivation of the reactive termini of the condensed oligomer will disadvantageously result. It is preferable to perform the condensation at 100° – 140°C to obtain the dimerized condensed product in high selectivity. The pure dimer can be separated by a purification. When the pure dimer is heated to promote polymerization, aromatic polymers with excellent melt fluidity can be obtained. The condensation time is about 30 minutes to 24 hours and may be extended if necessary.

By performing the condensation under the above conditions, a condensed oligomer, containing an average of 2 – 20 units which oligomer is a brittle solid having relatively low mechanical strength because the condensation degree is low, will result. The condensed oligomer should have an average condensation degree more than 2 to prevent distilling of the dihalodiphenyl compound during the solvent distillation and leaving the di-alkali metal salt of the diphenol which has a higher melting point. When a diphenol is converted to the corresponding di-alkali metal salt in a solvent, oxygen should be excluded by maintaining an inert gas atmosphere, such as nitrogen in the condensation reaction. The solvent is preferably anhydrous less than 1 wt. % water should be in the solvent of the reaction system. However, the condensation reaction, may be conducted with 1 – 20 wt. %, preferably 1 – 15 wt. % water in the solvent. In the latter case, part of the halogen atoms of the dihalodiphenyl compound will be sydrolyzed.

Aromatic polymers prepared by polycondensing the condensed oligomer, will not gel even when heated higher than 300°C for a long time without stabilizing the chain terminai of the polymer. It is preferable to distil the solvent from the reaction mixture under reduced pressure in the separation of the condensed oligomer from the solvent. Various conventional methods of efficiently distilling the solvent by spreading the surface of the reaction mixture my be employed. The condensed oligomer will be slightly polycondensed by the heating during the separation, however, the oligomer is usually a brittle solid having an average of 1 – 10 units.

The process for polycondensing the condensed oligomer will now be illustrated. The polycondensation is carried out by melting the condensed oligomer. The condensed oligomer can be polycondensed by heat-melting without stirring or with stirring in a kneader or an extruder equipped with heating and mixing devices. When an extruder is employed, the polymerization can be conducted continuously.

The condensed oligomer characteristicly softens at 150° – 220°C. Accordingly, the polycondensation can be carried out at the relatively low initiation temperature of 150° – 220°C which is preferable for condensed oligomers which are easily oxidized and degradated by heating. The temperature can be raised to a maximum of 400°C, depending upon the degree of polycondensation. If the temperature is lower than 150°C, the polymerization velocity will be disadvantageously low. If the temperature is higher than 400°C, thermal deterioration of the resulting aromatic polymer will disadvantageously result. Accordingly, the polycondensation is preferably carried out at 150° – 400°C, most preferably 180° – 380°C.

The aromatic polymer is prepared from the condensed oligomer by bulk polymerization, which requires no solvent. When the polycondensation is carried out with a solvent, the solvent will cause deterioration of the aromatic polymer, impart color by contamination, or form a gel of the aromatic polymer. In accordance with the process of the invention, these disadvantages are obviated. The polycondensation is preferably conducted under a non reactive atmosphere such as an inert gas atmosphere, e.g., nitrogen, argon, helium, or the like, or in a vacuum system, so as to prevent the oxidation and deterioration of the condensed oligomer and the resulting aromatic polymer at high temperature. The vacuum system should achieve a reduced pressure of less than 20 mm Hg.

The alkali metal halide formed in the polycondensation can be removed by extracting with water from the resulting aromatic polymer or by dissolving the resulting aromatic polymer in a polar organic solvent, such as dimethyl sulfoxide, chloroform, tetrachloroethane, or the like, and extracting with a solvent which is miscible only with the polar solvent, such as water, acetone, methanol, or the like to precipitate the polymer which is then washed with water.

The polyarylenepolyethers prepared by the process of the invention have a lower degree of coloring and lower degree of gelation as compared with the polymers prepared by the conventional process of polycondensing in the presence of a solvent. In the following examples, the viscosity $\eta_{inh}$ of the polymer is given by the equation, $$\eta_{inh} = (1/C) \cdot \log_e (t_s - t_o/t_o)$$

wherein $t_s$ = efflux time of the polymer solution;
$t_o$ = efflux time of the solvent;
$C$ = concentration of the polymer solution (g/100m).

The viscosity was measured at 30°C using 1.1.2.2 — tetrachloroethane as solvent in an Ubbelohdei visconmeter. The concentration of the polymer solution was 0.5 g/100m. The tensile modulus, tensile strength and elongation at breaking were measured using a sample film of the aromatic polymer 0.5 mm thick in ASTM D-638-58. The glass transition temperature of the aromatic polymer was measured with a differential colorimeter (manufactured by Parkin-Elmer Co.). The glass transition temperature was determined by conversion of changing calories to temperature. The degree of color of the polymer was obtained by measuring the transmittance of visible light at 400 – 800 m$\mu$ in 50m$\mu$, intervals through a transparent sample plate 1 mm thick and calculating the average transmittance. The thermal deterioration was obtained by heating the aromatic polymer at 350°C for 30 minutes in a heat press, dissolving 0.5 g of the polymer in 100 ml of tetrachloroethane, weighing the insoluble component (gel component) and calculating a weight percentage of the insoluble component based on 0.5 g as the gel component percentage.

The average condensation degree of the condensed oligomer was measured as follows:

The conversion of the monomer was obtained by measuring the alkali metal halide formed in the condensed oligomer with AgNO₃ solution. The average condensation degree is given by the equation $$\bar{n} = (1 + r)/[2r(1 - p) + (1 - r)]$$

wherein $p$ represents conversion, $\bar{n}$ represents the average condensation degree, $r$ represents the molar ratio of the dehalodiphenyl compound /di-alkalimetal salt of the diphenol or di-alkalimetal salt of diphenol/-dihalodiphenyl compound, and $r$ is 1 or less than 1. The melt index was measured with a melt indexer (manufactured by Toyo Seiki K.K.) under the conditions of 17.6 kg/cm² weight, an orifice diameter of 1 mm at the outlet of the polymer and 310°C temperature.

Having generally described the invention, a more complete understanding can be obtained by reference to certain specific examples, which are included for purposes of illustration only and are not intended to be limiting unless otherwise specified.

EXAMPLE 1

A 200 ml separatory flask equipped with a stirrer, a thermometer, a condenser and a water trap filled with benzene, was charged with 12.52 g (0.05 mole) of 4,4''-dihydroxydiphenylsulfone, 12.5 ml of 8N-KOH aqueous solution (0.1 mole of KOH), 100 ml of dimethylsulfoxide and 20 ml of benzene. The flask was purged with nitrogen gas to maintain an inert gas atmosphere. The mixture was refluxed for 4 hours to continuously remove water from the reaction system as an azeotropic benzene mixture, and then the benzene was removed by distallation to obtain a dimethylsulfoxide solution of the dipotassium salt of 4.4'-dihydroxydiphenylsulfone. A 14.36 g (0.05 mole) portion of 4,4'-dichlorodipheynlsulfone was added to the solution which was kept at 160°C in a nitrogen atmosphere, and the reaction was carried out at 160°C for 6 hours with stirring. The dimethylsulfoxide was removed by distillation under reduced pressure to obtain a brittle solid condensed oligomer. The solid was crushed to a fine powder and was dried at 100°C in a vacuum dryer for one day. A part of product was sampled and the potassium chloride was extracted and titrated with AgNO₃ by the potentiometric titration method. The conversion was 82.0 % which corresponds to an average condensation degree of 5.5. According to the infrared spectrum and NMR analysis, the condensed oligomer had the units having the formula

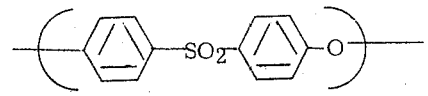

A 20 g amount of the condensed oligomer was placed in a large size test tube made of hard glass, and the test tube was kept in an electrical furnace at 185°C, under a reduced pressure of 2 – 3 mmHg. After 1 hour, the test tube was heated so as to reach 290°C after 30 minutes, and the tube was maintained at 290°C for 2 hours to polycondense the oligomer. After cooling, the test tube was broken to remove the aromatic polymer, which was dissolved in 1,1,2,2-tetrachloroethane and heated to 140°C. A small amount of methylchloride was added to inactivate the termini. After cooling and filtering, the resulting filtrate was poured into methanol to precipitate the aromatic polymer. The polymer had a viscosity $\eta_{inh}$ of 0.54 and had the following physical properties:

| | |
|---|---|
| Tensile modulus | 25,200 kg/cm² |
| Tensile strength | 760 kg/cm² |
| Elongation in breaking | 40 – 50 % |
| Glass transition temperature | 216°C |
| Average light transmittance | 84 % |

According to the NMR and infrared spectral analysis, the polymer had units having the formula

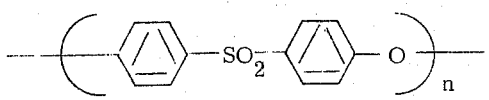

Reference 1

A 250 ml separatory flask equipped with a stirrer, a thermometer, a condenser and a water trap, was charged with 12.52 g (0.05 mole) of 4,4'-dihydroxydiphenylsulfone, 12.5 ml of 8N aqueous KOH solution (0.1 mole of KOH), 75 ml of purified tetrahydrothiophene -1,1-dioxide (sulfolane) and 50 ml of xylene in a nitrogen atmosphere. The flask was purged with nitrogen gas to maintain an inert atmosphere. The mixture was refluxed for 4 hours to remove water from the reaction system as an azeotropic xylene mixture and obtain the dipotassium salt of 4,4'-dihydroxydiphenylsulfone in an anhydrous mixture of sulfolane and xylene. A 14.36 g (0.05 mole) portion of 4,4'-dichlorodiphenylsulfone was added to the solution cooled to 45°C in a nitrogen atmosphere and the mixture was heated with stirring to 240°C. Most of the xylene distilled below 170°C. The reaction mixture was kept at 240°C with stirring for 3.75 hours and then cooled to 160°C. A small amount of methylenechloride was added to inactivate the termini. After cooling to 50°C, the reaction mixture was solidified in 2l of ethanol, and was repeatedly washed with ethanol and dried at 100°C under reduced pressure in a vacuum dryer for 1 day. According to the infrared spectrum and NMR analysis, the polymer had units having the same formula of Example 1. The polymer had viscosity $\eta_{inh}$ of 0.518, and the melt extruded film had black-brown color with the following physical properties.

| | |
|---|---|
| Tensile modulus | 25,500 kg/cm² |
| Tensile strength | 800 kg/cm² |
| Elongation in breaking | 40 – 50 % |
| Glass transition temperature | 217° C |
| Average light transmittance | 46 % |

Reference 2

A 300 ml separatory flask equipped with a stirrer, a thermometer, a condenser, and a water trap, was charged with 14.652 g (0.05103 mole) of 4,4'-dichlorodiphenylsulfone, 10.456 g of 54.76% of aqueous KOM solution (0.1021 mole of KOH) and 100 ml of dimethylsulfoxide in a nitrogen atmosphere. The flask was purged with nitrogen gas to maintain an inert atmosphere. The mixture was stirred at 100°C for 24 hours to hydrolyze the terminal chlorine atoms of the 4,4'-dichlorodiphenylsulfone and to form the corresponding potassium salt. A 40 ml portion of toluene was added to the reaction mixture and the mixture was refluxed at 100°C for 3 hours to remove water. A 100 ml portion of distilled sulfolane was added to the reaction mixture. The mixture was heated at 180° – 200°C under a reduced pressure of 2 mmHg to remove the toluene and dimethylsulfoxide. The resulting sulfolane solution of the potassium salt of 4-(4-chlorophenylsulfonyl) phenol was heated at 240°C with stirring for 7 hours in a nitrogen atmosphere. After the reaction, the reaction mixture was cooled to 180°C and a small amount of methyl chloride was added to inactivate the termini of the polymer. After cooling to room temperature, the reaction mixture was poured into water to precipitate the polymer and the polymer was washed with water and dried at 100°C for 12 hours under reduced pressure. The product had a black-brown color (Sample A). In accordance with the same process, the dimethylsulfoxide solution of the potassium salt of 4-(4-chlorophenylsulfonyl)phenol was prepared and the dimethylsulfoxide was distilled at 140°C to obtain the potassium salt of 4-(4-chlorophenylsulfonyl)phenol. A 10 g amount of the product was placed in a test tube made of hard glass and was polycondensed at 280°C under 2 mmHg for 2 hours in an electric furnace. The potassium salt of 4-(4-chlorophenylsulfonyl)phenol melted higher than about 275°C. The test tube was broken to remove the polymer, the polymer was dissolved in 1,1,2,2-tetrachloroethane, the solution was heated at 140°C and a small amount of methylchloride was added to inactivate the termini. After cooling and filtering, the filtrate was poured into methanol to precipitate the polymer, and the polymer was dried at 100°C under reduced pressure for 12 hours. The resulting polymer (Sample B) had a brown color, which was lighter than that of Sample A. The physical properties of Samples A and B were as follows:

| | A | B |
|---|---|---|
| Tensile modulus | | 25,400 kg/cm² |
| Tensile strength | brittle | 720 kg/cm² |
| Elongation in breaking | | 35 % |
| $\eta_{inh}$ | 0.24 | 0.38 |
| Glass transition temperature | 210 °C | 221 °C |
| Average light transmittance | 43 % | 64 % |

According to the infrared spectrum and NMR analysis, the polymer had units having the same formula of Example 1.

EXAMPLE 2

A 500 ml separatory flask was charged with 12.56 g (0.05 mole) of 2,4'-dichlorobenzophenone and 16.32 g (0.05 mole) of the dipotassium salt of 4,4'-dihydroxydiphenylsulfone dissolved in 200 ml of dimethylsulfoxide in a nitrogen atmosphere. The reaction was carried out at 160°C for 12 hours with stirring. The dimethylsulfoxide was removed by distillation under reduced pressure to obtain a brittle reddish brown solid. The solid was crushed to a fine powder and dried at 100°C in a vacuum dryer for 1 day. The conversion was 65.4 % which corresponded to an average condensation degree of 2.2. According to the infrared spectrum and NMR analysis, the condensed oligomer had units having the formula

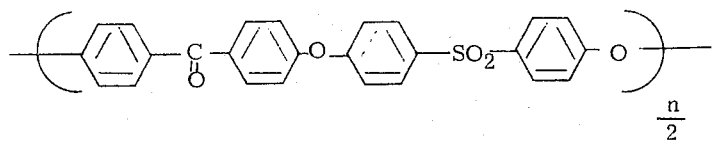

In accordance with the process of Example 1, 20 g of the condensed oligomer were polycondensed by heating without stirring. The polymer had viscosity $\eta_{inh}$ of 0.43 and had the following physical properties.

| | |
|---|---|
| Tensile modulus | 23,100 kg/cm² |
| Tensile strength | 700 kg/cm² |
| Elongation in breaking | 50 – 60 % |
| Glass transition temperature | 165°C |
| Average light transmittance | 81 % |

EXAMPLE 3

A 500 ml separatory flask was charged with 14.52 g (0.05 mole) of the dipotassium salt of 4,4'-dihydroxybenzophenone and 14.36 g (0.05 mole) of 4,4'-dichlorodiphenylsulfone dissolved in 200 ml of dimethylsulfoxide in a nitrogen atmosphere. The reaction was carried out at 140°C for 16 hours, and the dimethylsulfoxide was removed by distillation under reduced pressure to obtain a brittle dark green solid. The solid was crushed to a fine powder and dried at 100°C in a vacuum dryer for one day. The conversion was 76.3 % which corresponded to an average condensation degree of 4.2. According to the infrared spectrum and NMR analysis, the condensed oligomer had units having the formula

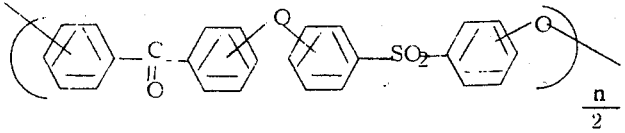

In accordance with the process of Example 1, 20 g of the condensed oligomer were polycondensed. The polymer had a viscosity $\eta_{inh}$ of 0.45 and had the following physical properties:

| | |
|---|---|
| Tensile modulus | 25,300 kg/cm² |
| Tensile strength | 700 kg/cm² |
| Elongation in breaking | 40 – 50 % |
| Glass transition temperature | 180 °C |
| Average light transmittance | 79 % |

EXAMPLE 4

A 200 ml of separatory flask equipped with a stirrer, a thermometer, and a condenser was charged with 16.32 g (0.05 mole) of the dipotassium salt of 4,4'-dihydroxydiphenylsulfone, 14.36 g (0.05 mole) of 4,4'-dichlorodiphenylsulfone and 100 ml of dimethylsulfoxide (110 g of DMSO). The flask was purged with nitrogen gas to maintain an inert gas atmosphere. Predetermined amounts of water were added to each of six flasks containing the mixture. The reaction was carried out at 120°C for 20 hours with stirring in a nitrogen atmosphere, and dimethylsulfoxide and water were removed by distillation under reduced pressure to obtain a brittle condensed oligomeric solid. The solid was crushed and dried in a vacuum dryer for one day. The conversion and average condensation degree of each sample are shown in Table 1. In accordance with the process of Example 1, 20 g of each of the condensed oligomers were placed in test tubes made of hard glass, and polycondensed under a reduced pressure of 2 – 3 mmHg. The results of viscosity $\eta_{inh}$, average light transmittance and gel component %, thermal oxidation-deterioration stability tests are shown in Table 1.

TABLE I

| Test No. | Water content | Water/DMSO (wt. %ratio) | Conversion (%) (average consensation degree) | $\eta_{inh}$ | Average transmittance (%) | Gel component (%) |
|---|---|---|---|---|---|---|
| 1 | 0 | 0/100 | 56.2 (2.3) | 0.501 | 79 | 26 |
| 2 | 1.7 | 1.5/98.5 | 53.6 (2.2) | 0.507 | 82 | 7 |
| 3 | 5.8 | 5/95 | 49.5 (2.0) | 0.493 | 84 | 3 |
| 4 | 12.2 | 10/90 | 44.5 (1.8) | 0.404 | 88 | 0 |
| 5 | 27.5 | 20/80 | 42.2 (1.7) | 0.328 | 83 | 0 |
| 6 | 47.1 | 30/70 | 38.3 (1.6) | 0.152 | — | — |

Reference 3

The process of Example 4 was repeated except that the reaction of 4,4'-dichlorodiphenyl sulfone with the dipotassium salt of 4,4'-dihydroxybenzophenone to form the condensed oligomer was carried out at 170°C for 6 hours in dimethylsulfoxide. The conversion was 80.3 % which corresponded to an average condensation degree of 5.1. The condensed oligomer was polycondensed by heating without stirring. The resulting polymer was slightly swellable in 1,1,2,2-tetrachloroethane, dimethylsulfoxide or cresol and most part of the polymer was a cross-linked gel.

Reference 4

A 500 ml separatory flask was charged with 14.3 g (0.05 mole) of 4,4'-dichlorodiphenyl sulfone and 16.32 g (0.05 mole) of the dipotassium salt of 4,4'-dihydroxydiphenylsulfone dissolved in 200 ml of dimethylsulfoxide in a nitrogen atmosphere. The reaction was carried out at 170°C for 4 hours. The conversion was 69.8 % which corresponded to an average condensation degree of 2.5. In accordance with the process of Example 1, the condensed oligomer was polycondensed without stirring to obtain a cross-linked polymer which did not substantially dissolve in 1,1,2,2-tetrachloroethane.

EXAMPLE 5

The process of Example 1 was repeated except that the amount of 4,4'-dichlorodiphenylsulfone was changed as shown in Table 2, to prepare the condensed oligomers. The number average condensation degree of the condensed oligomers are shown in Table 2. According to the infrared spectrum and NMR analysis, the condensed oligomers had units having this same formula as in Example 1. The condensed oligomers were polycondensed in accordance with the process of Example 1 to obtain the polymers. The viscosity $\eta_{inh}$ and average light transmittance of each of the polymers are shown in Table 2.

TABLE 2

| Test No. | A/B (molar ratio) | Amount of A (mole) | Number average condensation degree | $\eta_{inh}$ | Average light transmittance (%) |
|---|---|---|---|---|---|
| 7 | 1.05/1.00 | 48.244 g (0.1680) | 3.8 | 0.26 | 84 |
| 8 | 1.03/1.00 | 47.325 g (0.1648) | 4.1 | 0.39 | 83 |
| 9 | 1.015/1.00 | 46.635 g (0.1622) | 5.6 | 0.51 | 84 |
| 10 | 1.00/1.025 | 44.798 g (0.1560) | 5.3 | 0.40 | 82 |
| 11 | 1.00/1.05 | 43.758 g (0.1524) | 3.2 | 0.28 | 81 |

A = 4,4'-dichlorodiphenylsulfone
B = dipotassium salt of 4,4'-dihydroxydiphenylsulfone The polymers of Test Nos. 8, 9, and 10 formed strong films, however, the polymers of Test Nos. 7 and 11 formed brittle film.

EXAMPLE 6

The separatory flask of Example 1 was charged with 12.52 g (0.05 mole) of 4,4'-dihydroxydiphenylsulfone, 125 ml of 8N aqueous KOH solution (0.1 mole of KOH), 100 ml of dimethylsulfoxide, and 20 ml of benzene. The flask was purged with nitrogen gas to maintain an inert atmosphere. The mixture was refluxed for 4 hours to continuously remove water from the reaction system as an azeotropic benzene mixture, and the benzene was removed by distillation to obtain a dimethylsulfone solution dipotassium salt of 4,4'-dihydroxydiphenylsulfone. A 14.36 g (0.05 mole) portion of 4,4'-dichlorodiphenylsulfone was added to the solution kept at 120°C in a nitrogen atmosphere, and the reaction was carried out at 120°C for 4 hours with stirring. After cooling the reaction mixture was poured into 1 l of distilled water and the precipitate was filtered. A 25cc portion of 4 N-HNO₃ was added to the filtrate to form the precipitate. The precipitate was filtered, washed with hot water and dried at 120°C in a vacuum dryer for one day. According to the infrared spectrum and NMR analysis, the condensed oligomer had units having the formula

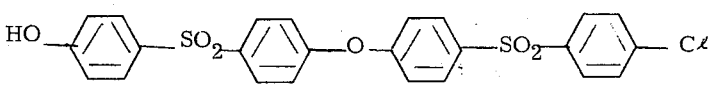

The molecular weight measured by an ebulliometer was 502, which is similar to the calculated value of 501. A 20.04 g (0.04 mole) amount of the condensed oligomer and 50 ml of water were charged in a 150 ml separatory flask purged with nitrogen gas and 10 ml of 4 N aqueous KOH solution (0.04 mole of KOH) was added in a nitrogen atmosphere. The mixture was stirred at 80°C for 30 minutes to obtain an aqueous solution, the water was removed by distillation under reduced pressure and the product was dried at 100°C under reduced pressure in a vacuum dryer for 1 day. The resulting condensed dimer of the dipotassium salt of 4,4'-dihydroxydiphenylsulfone and 4,4'-dichlorodiphenylsulfone, had the formula

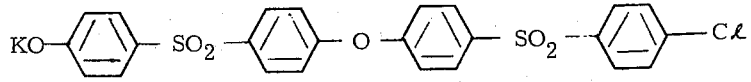 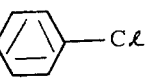

A 15 g portion of the powdery condensed dimer was placed in a test tube made of hard glass and was heated at 185°C without stirring under reduced pressure in an electrical furnace. After 1 hour, the test tube was heated so as to reach 285°C after 30 minutes, and was maintained at 285°C for 2 hours. After cooling the test tube was broken to remove the aromatic polymer. The aromatic polymer was dissolved in 1,1,2,2-tetrachloroethane and was heated to 140°C. A small amount of methylchloride was added to inactivate the termini. After cooling and filtering, the resulting filtrate was poured into methanol to precipitate the aromatic polymer. The polymer had a viscosity $\eta_{inh}$ of 0.524 and had the following physical properties

| Tensile modulus | 25,900 kg/cm² |
| Tensile strength | 820 kg/cm² |
| Elongation in breaking | 40 – 50 % |
| Glass transition temperature | 216 °C |
| Melt index | 1.5 g/10 min |
| Average light transmittance | 82% |

According to the infrared spectrum and NMR analysis, the polymer had units having the formula

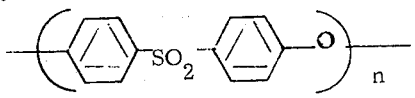

EXAMPLE 7

The condensed oligomer prepared from the dipotassium salt of 4,4'-dihydroxydiphenylsulfone and 4,4'-dichlorodiphenylsulfone was polycondensed, in accordance with the process of Example 6, except that a small amount of a molecular weight regulator, 4,4'-dihydroxydiphenylsulfone, was added as shown in Table 3 to obtain three types of aromatic polymers having different $\eta_{inh}$ values, melt index and average light transmittance.

Table 3

| Test No. | Condensed dimer | Dipotassium salt of 4,4'-dihydroxy-diphenylsulfone | η inh | Melt index | Average light transmittance |
|---|---|---|---|---|---|
| 1 | 10.78 g (0.02 mole) | 0.0326 g (0.0001 mole) | 0.436 | 72 g/ 10 mins. | 83% |
| 2 | do. | 0.0652 g (0.0002 mole) | 0.381 | 16.5 g/ 10 mins. | 85% |
| 3 | do. | 0.0978 g (0.0003 mole) | 0.342 | 36.3 g 10 mins. | 82% |

According to the infrared spectrum and NMR analysis, the polymer had the same units as in Example 6.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for preparing an aromatic polymer which comprises heating a condensed oligomer having an average of 1 – 10 units having the formula

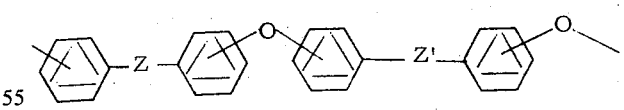

wherein Z represents —SO₂ or —CO—, or the rings are directly connected; Z' represents —SO₂ or —CO—; and the ether bond is ortho or para to Z or Z'; at 150° – 400°C under a nonreactive atmosphere in the absence of a solvent.

2. The process of claim 1, wherein the condensed oligomer is prepared by polycondensing a dialkalimetal salt of a diphenol having the formula

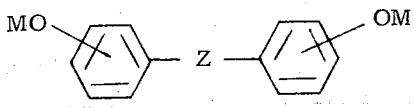

wherein M prepresents an alkali metal atom and Z is defined as above; with a dihalodiphenyl compound having the formula

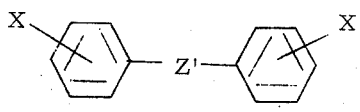

wherein X represents a halogen atom, and Z' is defined as above, in an inert polar organic solvent at 80° – 160°C in the molar ratio of 1.04 : 1.00 to 1.00 : 1.04.

3. The process of claim 2, wherein the inert polar organic solvent is a substantially anhydrous solvent.

4. The process of claim 2, wherein the inert polar organic solvent contains 1 – 20 wt. % of water.

5. The process of claim 1, wherein the condensed oligomer is heated at 180° – 380°C in a vacuum in the absence of a solvent.

6. The process of claim 1, wherein the condensed oligomer is heated at 180° – 380°C in an inert gas atmosphere in the absence of a solvent.

7. The process of claim 1, wherein the condensed oligomer has units having the formula

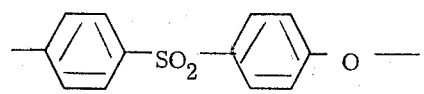

8. The process of claim 1, wherein the condensed oligomer has units having the formula

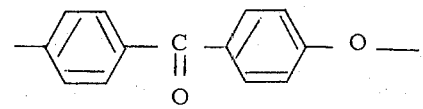

9. The process of claim 1, wherein the condensed oligomer has units having the formula

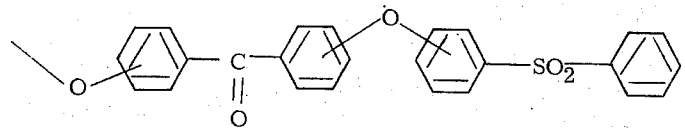

* * * * *

UNITED STATES PATENT AND TRADEMARK OFFICE
CERTIFICATE OF CORRECTION

PATENT NO. : 3,886,121
DATED : May 27, 1975
INVENTOR(S) : NORIO YAGI ET AL

It is certified that error appears in the above-identified patent and that said Letters Patent are hereby corrected as shown below:

Column 3, line 13, delete "dealkalimethalhalogenation" and insert therefor --dealkalimetalhalogenation.

Column 3, line 28, delete "ophene-1, 1-dioxide" and insert therefor --ophene-1,1-dioxide--.

Column 6, line 13, delete 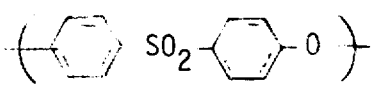

and insert therefor:-- 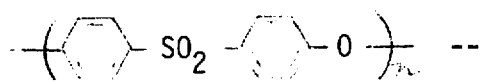 --

Column 12, delete Table 3 and insert therefor:

TABLE 3

| Test No. | Condensed dimer | Dipotassium salt of 4,4' dihydroxy-diphenylsulfone | $\eta$ inh | Melt Index | Average light transmittance |
|---|---|---|---|---|---|
| 1 | 10.78 g (0.02 mole) | 0.0326 g (0.0001 mole) | 0.436 | 72 g/10 min. | 83% |
| 2 | " | 0.0652 g (0.0002 mole) | 0.381 | 16.5 g/10 min. | 85% |
| 3 | " | 0.0978 g (0.0003 mole) | 0.342 | 36.3 g/10 min. | 82% |

UNITED STATES PATENT AND TRADEMARK OFFICE
CERTIFICATE OF CORRECTION

PATENT NO. : 3,886,121
DATED : May 27, 1975
INVENTOR(S) : NORIO YAGI ET AL

It is certified that error appears in the above-identified patent and that said Letters Patent are hereby corrected as shown below:

Column 1, lines 55 and 56, delete "polymer" and insert --polymers--.
Column 2, line 5; Column 4, line 50; and Column 12, line 61, delete "non-reactive" and insert --unreactive-- therefor.
Column 3, line 5, delete "4,4'-dihydrocybenzophenone," and insert --dihydroxybenzophenone,-- therefor.
Column 3, line 9, delete "Z' of the" and insert --Z' in the--.
Column 3, line 11, after "halogen atoms" insert --in the position--.
Column 4, line 4, delete "sydrolyzed" and insert --hydrolyzed--.
Column 4, line 9, delete "terminai" and insert --terminal--.
Column 4, line 27, delete "characteristicly" and insert --characteristically-- therefor.
Column 4, lines 60 and 63, delete "polar".
Column 5, lines 8 and 11, delete "g/100 m" and insert --g/100 ml--.
Column 5, lines 10-11, delete "visconmeter" and insert --viscoimeter--.
Column 5, line 20, delete "color" and insert --coloring--.
Column 5, line 21, delete "50 mµ," and insert --50 mµ-- therefor.
Column 5, line 41, delete "dehalodiphenyl" and insert --dihalodiphenyl--
Column 5, lines 57&58, delete "4,4"" and insert --4,4'--.
Column 5, line 65, delete "a dimethyl" and insert --dimethyl--.
Column 6, line 6, after "A part of" insert --the--.
Column 7, line 14, delete "KOM" and insert --KOH--.
Column 7, line 45, delete "In accordance, with" and insert --In accordance with--.
Column 10, Table 2, delete "inh" and insert -- ninh--.
Column 11, line 4, after "solution" insert --of a--.

Signed and Sealed this first Day of June 1976

[SEAL]

Attest:

RUTH C. MASON
Attesting Officer

C. MARSHALL DANN
Commissioner of Patents and Trademarks